United States Patent [19]

Mörsky et al.

[11] Patent Number: 4,827,992
[45] Date of Patent: May 9, 1989

[54] METHOD FOR CONDUCTING A FLUID INTO A ROCK CISTERN

[75] Inventors: Esa Mörsky; Risto Penttinen, both of Porvoo, Finland

[73] Assignee: Neste Oy, Finland

[21] Appl. No.: 118,204

[22] Filed: Nov. 6, 1987

[51] Int. Cl.$^4$ .............................................. B65B 3/04
[52] U.S. Cl. ......................................... 141/11; 141/4; 141/82
[58] Field of Search ................... 141/1, 11, 69, 82, 37, 141/48, 98

[56] References Cited

U.S. PATENT DOCUMENTS

| 4,450,878 | 5/1984 | Takada et al. | 141/82 X |
| 4,489,767 | 12/1984 | Yamada | 141/82 X |
| 4,556,091 | 12/1985 | Poulsen | 141/82 |

FOREIGN PATENT DOCUMENTS 1417235 9/1964 France .................................. 141/4

Primary Examiner—Ernest G. Cusick
Attorney, Agent, or Firm—Steinberg & Raskin

[57] ABSTRACT

A method for conducting, into a rock cistern, gas or liquid which is colder than the rock cistern temperature. In this procedure, gas or liquid is fed through a feeder pipe into a gas space of the rock cistern, through a feeder pipe construction for conducting gas or liquid into the gas space of the rock cistern. The feeder pipe of the rock cistern is enclosed within a protective tube or housing. A tubular connector extends from the gas space of the rock cistern into an intermediate space formed between the feeder pipe and the protective tube or housing, for circulating saturated gas present in the gas space of the rock cistern between the gas sapce of the rock cistern and the intermediate space, in a preferred embodiment.

8 Claims, 1 Drawing Sheet

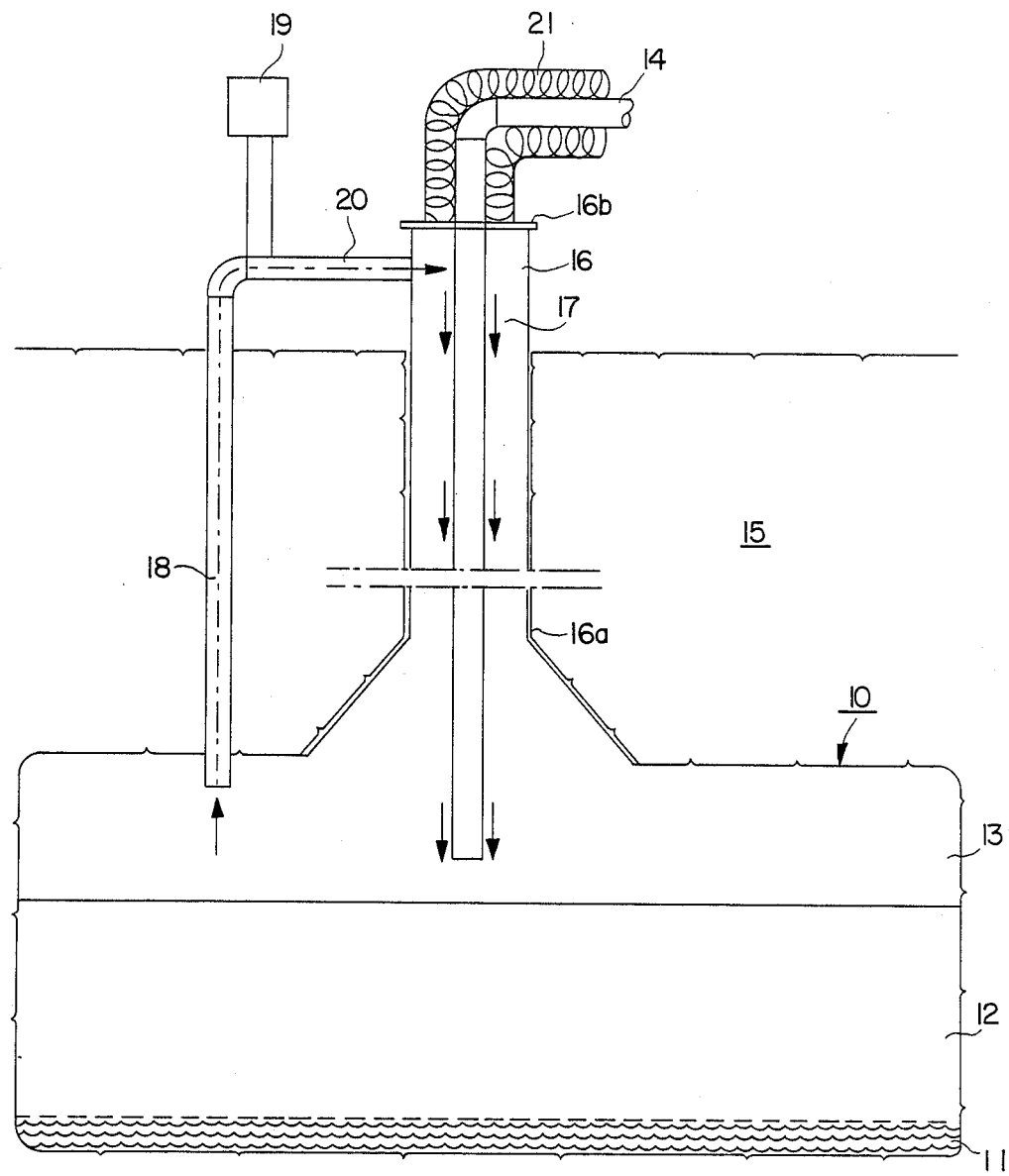

METHOD FOR CONDUCTING A FLUID INTO A ROCK CISTERN

BACKGROUND OF THE INVENTION

The present invention concerns a procedure for conducting, into a rock cistern, gas or liquid which is colder than the rock cistern temperature, wherein the gas or liquid is conducted through a feeder pipe into the rock cistern or into a gas space thereof.

The present invention also concerns a feeder pipe construction in a rock cistern for conducting gas or liquid into the rock cistern or into the gas space of the rock cistern.

Gases or liquids are stored in rock cisterns which have a space for liquid over a water bed or a dry bottom, and a gas space over the liquid space. For example, butane, propane, gas condensate, etc. may be noted among liquefied gases which may be stored in rock cisterns. Similarly, fuels such as petrol, aviation kerosene, etc., are stored in rock cisterns.

In rock cisterns without lining, where the storage temperature of the stored liquid or gas is over 0° C., the ground water in the rock or an artificial curtain serves to seal the rock cistern. If cold gas or liquid (under 0° C.) is conducted into the rock cistern, then the cold operating pipe will bind or sap heat from the surroundings. This causes freezing of the rock or of the surroundings of the pipe. The ground water or water curtain system in the rock or in the soil around the pipe will then freeze. Ice is produced as such, which will break structures and cause cracks in the rock and around the pipe. As a result of this damage, leaks appear in the pressurized cistern. Furthermore, freezing causes disturbances in the ground water flow or in the artificial water curtain system.

SUMMARY OF THE INVENTION

Accordingly, it is an object of the present invention to achieve improvement over procedures known in the art and over feeder pipe constructions presently used.

It is also an object of the present invention to avoid freezing of rock and surrounding areas about a feeder pipe for fluid into an underground rock cistern.

It is a more detailed object of the present invention to provide a procedure and a rock cistern feeder pipe structure which enable gas or liquid which is colder than temperature in a rock cistern, to be conducted into the rock cistern without incurring any substantial change of the surrounding rock or soil temperature.

These and other objects are attained by the present invention which is directed to a method for conducting a fluid into a rock cistern, the fluid being colder than a temperature of the rock cistern itself. A feeder pipe for the fluid into the rock cistern is enclosed with a protective tube or housing to form an intermediate space therebetween, which communicates at a lower end thereof with a gas space of the cistern. Gas is conducted into the intermediate space between the feeder pipe and the protective tube or housing, while the fluid itself is conducted into the cistern through the feeder pipe.

The present invention is also directed to apparatus for conducting a fluid into a rock cistern, which comprises a feeder pipe for the fluid into the rock cistern, and a protective tube or housing enclosing the feeder pipe and forming an intermediate space therebetween which communicates at a lower end thereof with a gas space of the rock cistern and which receives gas therein.

More specifically, the objects of the present invention are attained with a method which is principally characterized by the feeder pipe of the rock cistern being enclosed in a protective tube or housing, and with gas being conducted into an intermediate space between the feeder pipe and the protective tube or housing. This intermediate space communicates, at a lower end thereof, with a gas space of the rock cistern.

According to a preferred embodiment, saturated gas which is present in the gas space of the rock cistern is used for the gas conducted into the intermediate space. According to another preferred embodiment, gas from an external gas source is used for the gas conducted into the intermediate space.

Furthermore, the rock cistern feeder pipe system of the present invention is principally characterized by the feeder pipe of the rock cistern being enclosed in a protective tube or housing, with a tubular connector from a gas space of the rock cistern connected to the intermediate space between the feeder pipe and the protective tube or housing, for circulating saturated gas available in the gas space of the rock cistern, between the gas space of the rock cistern and the intermediate space between the feeder pipe and the outer protective tube or housing.

BRIEF DESCRIPTION OF THE DRAWING

The present invention will now be described in greater detail with reference to the principles and designs thereof illustrated in the accompanying figure, to which the present invention is not intended to be exclusively confined. In the drawing, the figure illustrates a preferred embodiment of the rock cistern feeder pipe construction employed in the method of the present invention.

DESCRIPTION OF THE PREFERRED EMBODIMENTS

In FIG. 1, the rock cistern is generally indicated by reference numeral 10. The rock cistern 10 contains a bed of water 11, a liquid space 12 thereon, and a gas space 13 thereon. Gas or liquid to be stored is conducted into the gas space 13 of the rock cistern 10 through a feeder pipe 14. Rock is indicated by reference numeral 15.

According to fundamental concepts of the present invention, the feeder pipe 14 is enclosed within a protective tube or housing 16, which is open at the lower end thereof and communicates with the gas space of the rock cistern 10. The free lower end of the protective tube or housing 16 is denoted by reference numeral 16a, and the top-end flange thereof by reference numeral 16b. According to the design or structure of the present invention, an intermediate space 17 is formed between the feeder pipe 14 and the protective tube or housing 16, into which gas is conducted according to the fundamental concepts of the present invention, either from the gas space 13 of the rock cistern 10 through a circulation duct 18, or from an external gas source 19 and along a line 20 as illustrated. Thermal lagging of the feeder pipe 14 has been indicated by reference numeral 21. This lagging 21 may be wool or any other equivalent lagging material.

The distinctive feature of the method of the present invention, is that the colder the temperature of the liquified gas or liquid that is being fed through the feeder pipe 14 is, the faster the saturated gas of the gas space 13 of the rock cistern that is circulating through the duct 18 will condense around the feeder pipe 14, and the thicker will be the layer of the condensate which is thus formed. This layer running down the feeder pipe 13 thereby efficiently prevents transfer of "cold" into the intermediate space 17 and then further into the rock 15, i.e. prevents cooling of the rock 15 or transfer of heat into the pipe 14.

The gas space 13 of the rock cistern 10 contains gas or a gas mixture of the kind that is being stored in each instance.

When an external gas source 19 is utilized, then the temperature of any such gas is, in order of magnitude, equal to or somewhat higher than the temperature of the saturated gas in the gas space of the rock cistern 10. The same kind of gas which is being stored in the rock cistern 10 may naturally be used in the external gas source 19, in each instance.

When cold, gasified liquid to be stored or other liquid to be stored is fed into the rock cistern 10, then the gas space 13 of the rock cistern 10 is temporarily slightly cooled and the pressure drops. However, such cooling is minimal (on the order of about 1° or 2° C.), because the volume of the gas space 13 is extremely large.

The preceding description of the present invention is merely exemplary, and is not intended to limit the scope thereof, with numerous modifications thereof being feasible.

What is claimed is:

1. Method for conducting a fluid into a rock cistern, said fluid being colder than a temperature of said rock cistern, comprising the steps of
    enclosing a feeder pipe for the fluid into said rock cistern with a protective tube or housing, to form an intermediate space therebetween which communicates at a lower end thereof with a gas space of the cistern,
    conducting gas into said intermediate space between said feeder pipe and said protective tube or housing, and
    conducting the fluid into said cistern through said feeder pipe.

2. The method of claim 1, wherein said gas in said intermediate space between said feeder pipe and protective tube or housing insulates surrounding rock from the fluid fed through said feeder pipe.

3. The method of claim 1, wherein saturated gas from the gas space of the cistern is conducted into said intermediate space,
    whereby said saturated gas condenses around an outer periphery of said feeder pipe and insulates surrounding rock from the fluid fed through said feeder pipe.

4. The method of claim 1, wherein said gas is fed into said intermediate space from an external gas source.

5. The method of claim 4, wherein temperature of said gas is equal to or slightly higher than temperature of saturated gas in said cistern gas space.

6. The method of claim 4, wherein said gas fed to said intermediate space is the same as gas stored in said cistern gas space.

7. The method of claim 1, wherein said gas is fed into said intermediate space by circulation from said gas space of said cistern into an upper portion of said intermediate space.

8. The method of claim 1, wherein said cistern additionally comprises a liquid space underneath said gas space and a bed of water underneath said liquid space.

* * * * *